No. 617,385. Patented Jan. 10, 1899.
W. P. WRIGHT.
GRAIN ELEVATOR.
(Application filed Dec. 14, 1897.)
(No Model.) 2 Sheets—Sheet 1.
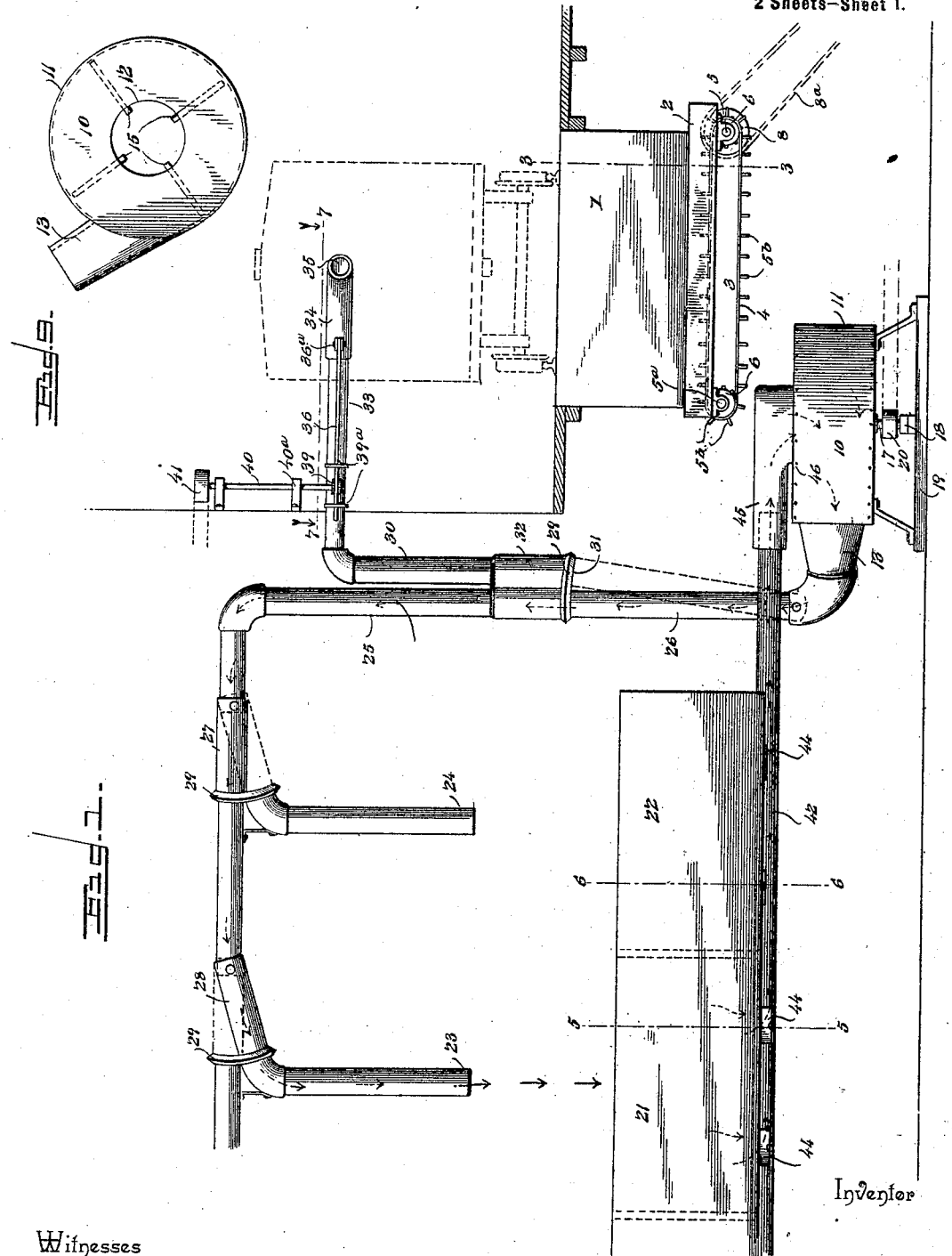
Witnesses
Willis P. Wright
By his Attorneys,

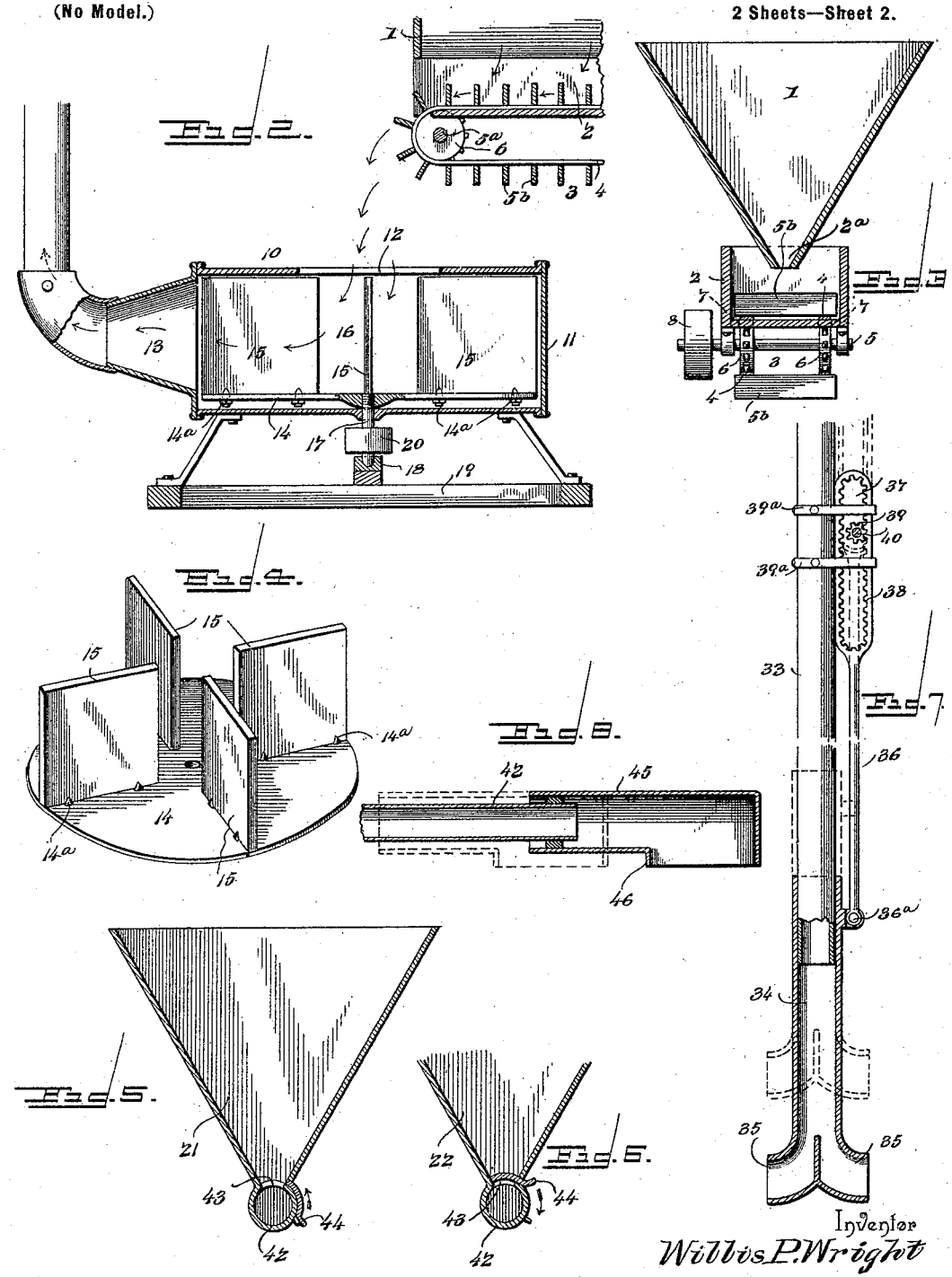

UNITED STATES PATENT OFFICE.

WILLIS P. WRIGHT, OF BLANDINSVILLE, ILLINOIS.

GRAIN-ELEVATOR.

SPECIFICATION forming part of Letters Patent No. 617,385, dated January 10, 1899.

Application filed December 14, 1897. Serial No. 661,889. (No model.)

*To all whom it may concern:*

Be it known that I, WILLIS P. WRIGHT, a citizen of the United States, residing at Blandinsville, in the county of McDonough and State of Illinois, have invented a new and useful Grain-Elevator, of which the following is a specification.

This invention relates to improvements in grain-elevators of that class wherein the energy of a current or blast of air is utilized as the medium for conveying the grain to and from storage-bins; and one of the objects that I have in view is to so construct and arrange the parts that the grain may be aerated by conveying it to the fan and back to the bin whenever it is desired to overcome the tendency of the grain to become moldy.

A further object of this invention is to so arrange the various parts of the conveyer mechanism that the grain may be delivered to any one of a series of storage-bins or carried to a car or vessel for delivery thereto.

A further object that I have in view is to secure the delivery of the grain to opposite ends of a car or vessel, and thereby load the latter uniformly from both ends toward the center thereof.

With these ends in view my invention consists in the novel construction and arrangement of parts, which will be hereinafter fully described and claimed.

To enable others to understand my invention, I have illustrated the preferred embodiment thereof in the accompanying drawings, forming a part of this specification, and in which—

Figure 1 is a diagrammatic elevation of a grain-conveyer constructed in accordance with my invention and illustrating by dotted lines a car in position to deliver to the receiving bin or pit or to receive and be loaded by grain from the delivery-spout of the system. Fig. 2 is a vertical sectional elevation taken through the conveyer-fan and illustrating a part of the traveling conveyer and the pneumatic conveyer-tube. Fig. 3 is a vertical transverse sectional view through the receiving-pit and the traveling conveyer therein on the plane indicated by the dotted line 3 3, Fig. 1. Fig. 4 is an enlarged perspective view of the rotary conveyer-fan detached from its casing and driving-shaft. Figs. 5 and 6 are enlarged fragmentary sectional views through the storage-bins and the return pipe or flue on the planes indicated by the dotted lines 5 5 and 6 6, respectively, of Fig. 1. Fig. 7 is an enlarged detail view, partly in section and partly in elevation, on the plane indicated by the dotted line 7 7 of Fig. 1, but showing the adjustable spout on the delivery-pipe in an inverted position. Fig. 8 is a detail view of the delivery-pipe section adapted for service in connection with the return-pipe and the conveyer-fan for the purpose of delivering to the latter the grain from any one of a series of storage-bins whenever desired to aerate the grain in any one of the storage-bins. Fig. 9 is a plan view of the fan, illustrating the tangential arrangement of the discharge-mouth thereof.

Like numerals of reference denote like and corresponding parts in each of the several figures of the drawings.

In my improved grain-elevator I have constructed the conveyer-fan and the receiving pit or hopper in a manner to enable the grain from a car to be dumped or deposited directly into said hopper preliminary to conveying the grain in regulated volumes to the conveyer-fan, by which it is forced into a pneumatic conveyer tube or pipe for delivery to a series of storage-bins or back to the car or other vehicle. The receiving pit or hopper 1 of my apparatus is erected adjacent to a track on which a car is adapted to travel, as indicated by dotted lines in Fig. 1. This hopper or pit has inclined walls which converge downwardly to form a narrow slot or passage $2^a$, and this slot discharges to a trough 2, whereby the pressure and weight of the grain are not imposed upon the endless conveyer 3. The latter may be operated in the trough without waste of power, and a full and free supply of grain is insured to the conveyer. In this trough 2 is arranged the traveling conveyer 3, adapted to move horizontally and longitudinally within the trough to remove the grain therefrom and gradually and uniformly feed the grain to the conveyer-fan. This traveling conveyer is composed of a pair of parallel endless sprocket-chains 4 and a series of buckets or paddles $5^b$, which are attached to said chains, transversely across the same, and project outwardly therefrom. The chains of the traveling conveyer engage with the sprocket-wheels 6 on the horizontal shafts 5 5ª, which are journaled in suitable bearings on the lower side of the trough-shaped bottom 2, whereby the conveyer is supported in operative relation to the receiving pit or hopper. One of these shafts, 5ª, is an idler-shaft adjacent to the conveyer-fan 10, and the other shaft, 5, of said traveling conveyer 3 is equipped with a pulley 8, around which is passed a belt 8ª (indicated by dotted lines in Fig. 1) for the purpose of imparting traveling movement to said conveyer. The sprocket-wheels 6 work in slots 7, provided in the trough-shaped bottom 2 of the receiving pit or hopper, and as the chains are propelled by the shaft 5 the buckets are caused to travel through the trough-shaped bottom 2 and move the grain from the hopper to the fan 10. The conveyer-fan 10 is situated beneath the horizontal plane of the receiving-pit and its traveling conveyer, and the grain is discharged from the conveyer 3 to the eye of the fan-casing, which fan-casing eye is open for the free admission of air. The current of air drawn in by the fan and the gravity of the grain delivered by the conveyer 3 insure the passage of the grain from the conveyer directly to the fan. This fan is arranged to rotate within a suitable casing 11 of annular form and equipped with a central feed opening or eye 12, in the upper horizontal head thereof, said fan-casing being also provided with a tangentially-arranged delivery-spout 13, to which is connected the pneumatic conveyer-tube. The fan consists of a disk-like base 14 and a series of radial wings 15, seated upon the upper side of the disk 14 and secured rigidly thereto—as, for instance, by the bolts 14ª, which project from the lower edges of the wings and have nuts screwed on the bolts to bear against the disk 14, whereby the wings are clamped rigidly to the upper face of the disk. The wings 15 are secured on the rotatable disk 14 to have the inner ends of the said wings terminate at suitable distances within the vertical axial line of said disk 14, thus providing a space or opening 16 between the adjacent terminals of said radial wings, and this space is in line with the vertical feed eye or opening 12 in the fan-casing. The rotary fan is mounted on or carried by a vertical shaft 17, having its lower end stepped in a bearing 18 of the main frame 19, upon which the fan-casing is supported in a suitable manner, and on this depending vertical fan-shaft 17 is rigidly secured a pulley 20, around which may be passed a belt for the purpose of giving the rotary motion to the fan within its casing.

I employ a series of storage-bins, which are arranged one alongside of the other or in any other suitable way. The grain is delivered to the storage-bins by a series of depending spouts, and in Fig. 1 of the drawings I have shown a series of two bins and a corresponding series of delivery-spouts. It will be understood, however, that the number of bins and the delivery-spouts therefor may be varied, as deemed expedient, according to the desired capacity of the grain-storage elevator. The delivery-spouts 23 24 overhang the storage-bins to which they relate, and any suitable means may be provided for sustaining these delivery-spouts in their vertical suspended positions above the storage-bins to which they are designed to deliver the grain.

Between the conveyer-fan and the delivery-spouts is arranged a conveyer-pipe 25, having vertical and horizontal lengths designed to afford communication between the fan and the delivery-spouts to the storage-bins, and this conveyer-pipe is equipped with a series of adjustable sections which may be moved or positioned according as it is desired to transfer the grain from the pit or hopper to the storage-bins or from the storage-bins to a delivery-pipe by which the grain may be loaded into a car or vessel. The conveyer-pipe is shown by Fig. 1 with a series of three adjustable lengths or sections 26, 27, and 28, and of these adjustable sections the section 26 is arranged for service in connection with the vertical length of the conveyer-pipe, while the sections 27 28 are positioned in operative relation to the horizontal length of the conveyer-pipe and to the depending delivery-spouts 23 24. Each adjustable length of the conveyer-pipe is loosely or pivotally supported at one end, while the free end of the adjustable length or section is arranged to be held in position by a guide 29 of any suitable construction.

The means for transferring the grain from the storage-bins to a car or vessel consists of a delivery-pipe 30, having horizontal and vertical lengths adjacent to the elevator building or structure. The vertical length of the delivery-pipe 30 has a receiving end 31, united by a coupling 32 to the vertical length of the conveyer-pipe 25, above the adjustable section 26 therein, and said adjustable section 26 of the conveyer-pipe is so mounted upon or connected to the delivery-spout 13 of the fan-casing that said length or section 26 may be adjusted to deliver to the delivery-pipe 31 or to the conveyer-tube 25, as indicated by full and dotted lines in Fig. 1. The end 33 of the delivery-pipe 30 is designed to project into a car or vessel or other vehicle into which the grain is to be loaded, and on said delivery end of the delivery-pipe is mounted a reciprocating spout 34. The outer extremity of this reciprocating spout is provided with oppositely-facing mouths 35, as shown by Figs. 1 and 7, and this reciprocating spout is loosely fitted on the end 33 of said delivery-pipe, so as to slide horizontally thereon under the influence of a reciprocating bar 36. This reciprocating bar is arranged exteriorly to the delivery-pipe and its reciprocating spout, and the lower end of said bar is attached pivotally to the reciprocating spout, as indicated at 36ª in Fig. 7. One end of the reciprocating bar is widened and flattened to enable a slot 37 to be formed therein, and the inner edges of this slot are provided with continuous gear-teeth 38, which are formed on the opposing side and end edges of said slot, as shown. The reciprocating bar is loosely confined in operative relation to the end of the delivery-pipe by means of suitable keepers 39ª, and said bar is reciprocated in a horizontal direction by motion from a driving-pinion 39, arranged to mesh with the teeth 38 of the rack-bar. This driving-pinion 39 is fastened rigidly to a shaft 40, which is journaled in suitable bearings on the fixed bracket 40ª, and one end of said shaft has a belt-pulley 41, around which may be passed a belt for the purpose of rotating the shaft and causing its pinion to reciprocate the rack-bar and the slidable spout 34 of the delivery-pipe 30.

One of the important features of my conveyer apparatus is the provision of means for returning the grain from the storage-bins to the fan-casing and for redelivering the grain from the fan-casing back to the storage-bins for the purpose of aerating the grain whenever it shows a tendency to become moldy from remaining in the bins. In this embodiment of my invention I employ a return pipe or tube 42, which is situated beneath the series of storage-bins 21 22, and this pipe or tube has a plurality of ports or openings 43, spaced at suitable intervals therein, so that two or more of these openings communicate with each of the bins 21 22, as shown by Fig. 1 and by the detail views Figs. 5 and 6. I prefer to construct each of the storage-bins with inclined or converging walls and to arrange the return pipe or tube 42 at the line where said walls approach each other, whereby the openings or ports 43 may be conveniently formed in the upper side of said return pipe or tube for the grain to flow from each bin through its proper ports into the return-pipe 42. This return-pipe is thus arranged in a manner to be common to a series of storage-bins, and communication between the pipe and each storage-bin is controlled by employing a series of valves or gates 44. Each valve or gate is slidably fitted to the return-pipe and the hopper in a manner to be drawn outwardly and open the port 43 or to be closed and prevent the passage of grain from the bin into the return-pipe. The detailed construction of the valve or gate is not material, however, and the same may be varied within the province of a skilled mechanic. The return pipe or tube 42 extends toward the conveyer-fan 10 to have one end thereof terminate adjacent to said fan, and communication between the return-pipe and the fan is established by means of a telescopic pipe or tube 45, which is slidably fitted to the terminal of said return-pipe. This telescopic pipe or tube is provided with a pendent flange 46, constituting a delivery-mouth adapted to fit the eye or feed-opening 12 of the fan-casing, and said telescopic pipe or tube is adapted to fit tightly on the return-pipe in a manner to enable it to slide back and forth thereon toward or from the fan-casing. When the grain is to be conveyed from the pit or hopper through the conveyer-fan and the conveyer-pipe 25 to the storage-bins, the telescopic pipe 45 is detached from the fan-casing and the traveling conveyer 3 is set in operation to move the grain from the pit or hopper to the fan 10. By providing the return-tube with a series of ports and independent valves therefor in connection with each hopper of the series I am able to regulate the flow of grain from the desired hopper to the return-pipe and obviate choking or clogging of said pipe by the feeding of a large volume of grain suddenly from the hopper into the return-pipe, and by arranging the return-pipe for use in connection with a series of bins and controlling the communication between each bin and the return-pipe the grain may be delivered to the return-pipe from any one of the series of bins.

The operation may be described, briefly, as follows: To convey the grain from the receiving-pit to any one of the series of bins, the pipe-section 26 is adjusted in line with the fan-spout 13 and the vertical length of the conveyer-pipe 25 and the pipe-sections 27 28 are adjusted in line with the horizontal length of the conveyer-pipe 25 and to communicate with the depending spout 23, respectively, as shown by Fig. 1, to deposit the grain into the storage-bin 21. The grain is conveyed from the receiving pit or hopper by the traveling motion of the conveyer 3, and as the grain escapes from the traveling conveyer it enters the fan-casing through the eye or opening 12. The grain is deposited upon the revolving disk of the fan through the space 16 between the wings or blades 15, and as the fan is rotated rapidly the grain is subjected to centrifugal action and carried by the current of air through the tangential spout 13 and into the conveyer-pipe 26, 25, 27, and 28, from whence it is deposited through the spout 23 into the bin 21. To change the course of the grain after the bin 21 shall have been filled, the pipe-section 27 is adjusted to communicate with the spout 24, and the grain from the receiving-pit and fan is conveyed by the pipe 25 into the spout 24 and thence deposited into the storage-bin 22. If desired, the pipe-sections 27 28 may be adjusted in line with the horizontal length of the conveyer-pipe 25 for the purpose of transferring the grain to other pipe-sections to deliver to other bins, as will be readily understood.

For loading the grain into a car, vessel, or other vehicle the telescopic or slidable pipe 45 is adjusted to the fan-casing to connect the return-pipe 42 with said fan, and at the same time the section or length 26 of the conveyer-pipe is adjusted in line with the receiving end 31 of the discharge-tube 30. The fan being in motion and the valves or gates from one of the bins 21 or 22 being opened the grain is allowed to flow by gravity through the ports or openings 43 from the bin into the return-tube, and as one end of this return-tube is open, the current of air entering therein and drawn by the action of the fan through said return pipe or tube 42, the grain is conveyed from the storage-bin into the fan-casing and flows from the latter through the pipe 26 into the delivery-pipe 30 and thence to the horizontally-reciprocating spout 34. The shaft 40 is rotated to reciprocate the bar 36 in a horizontal direction and thus move the spout 34 on the end 33 of the delivery-pipe, and as the grain is supplied continuously from the fan to the reciprocating spout 34 it is discharged from the spout 34 in opposite directions through the nozzles 35 thereof. By reciprocating the spout 34 horizontally within the car or vessel the discharge-nozzles 35 of the spout are caused to traverse the car from side to side, and as the grain is forced or carried by the current of air from the fan 10 it is thrown outwardly toward the ends of the car or vessel for the purpose of loading the latter from side to side and the ends toward the middle thereof, thereby insuring uniformity in the loading of the car.

To aerate the grain when it has been standing in the bins for a long time and prevent it from becoming moldy, the adjustable pipe-section 26 is adjusted in line with the vertical length of the pipe 25 for the purpose of conveying the grain from one of the storage-bins through the fan to the pipes 26 25, back to the depending spout to the bin from which the grain is drawn, whereby the grain is subjected to the current of air of the fan and carried from its bins through the fan and back to the bin again.

My apparatus may also be used for the purpose of conveying the grain from the pit directly to a car or other vehicle without passing to the bins, and in this adaptation of the apparatus the pipe-section 26 is adjusted in line with the delivery-pipe 30. The grain is moved from the pit by the conveyer 3 to the fan, and the current of air from the latter carries the grain through the pipes 26 and 30 to the spout 34, the latter serving to deliver the grain to the car or other vehicle.

In the storage of grain as at present practiced it is customary to erect a large and towering building adjacent to a railroad-track or steamship-wharf, so as to secure a pitch for the grain to deliver the latter by gravity into a car, and to employ long belt or chain and bucket conveyers and other machinery at the top of the elevator structure. My invention obviates the expense of erecting such storage-elevators and the employment of the usual bucket conveyers. My apparatus requires simply an inexpensive series of storage-bins erected in any desired position with reference to the railway-track or a wharf. The apparatus may be on a level with or slightly below the track or wharf and need not necessarily be adjacent to either, which is advantageous, because in cities it is quite an expense to obtain a proper site for the structure. In my apparatus the pneumatic conveyer provides for carrying the grain horizontally a suitable distance to the storage-bins.

My apparatus is very efficient in keeping the grain from heating spontaneously, owing to the fact that the grain is exposed liberally to the air during its passage to or from the storage-bins and the conveyer-fan.

I am aware that changes in the form and proportion of parts and in the details of construction may be made without departing from the spirit or sacrificing the advantages of the invention, and I therefore reserve the right to make such alterations and changes as properly fall within the scope of the invention.

Having thus described my invention, what I claim as new, and desire to secure by Letters Patent, is—

1. In a pneumatic grain-elevator, the combination with a conveyer-fan, and storage-bin, of a conveyer-pipe leading to the bin, a discharge-pipe having one end terminating adjacent to the receiving end of the conveyer-pipe, and an adjustable pipe between the conveyer-fan and said discharge-pipe or conveyer-pipe and adapted to aline with either the conveyer-pipe or the discharge-pipe, substantially as described.

2. In a pneumatic grain-elevator, the combination with a series of bins, and a conveyer-fan, of a conveyer-pipe having adjustable lengths or sections, depending spouts with which the adjustable lengths or sections of the conveyer-pipe may be adjusted to communicate, and a return-pipe situated at the bottom of the bins and adapted to be connected with the fan-casing, substantially as and for the purposes described.

3. In a pneumatic grain-elevator, the combination with a series of bins, and a fan, of a return-pipe common to all of the bins of the series and provided at suitable intervals with a series of valve-controlled openings or ports adapted to communicate with either of the bins, a delivery-pipe, and a conveyer-pipe having an adjustable length or section operatively connected with the fan-casing and adapted to be adjusted to communicate either with the conveyer-pipe or the delivery-pipe, substantially as and for the purposes described.

4. In a pneumatic grain-elevator, the combination with a series of independent bins, and a conveyer-fan, of a return-pipe common to the storage-bins and having a series of valve-controlled ports for communication with either of said storage-bins, means for operatively connecting the return-pipe with the conveyer-fan, a discharge-pipe, and a conveyer-pipe having a discharge length or section which is operatively connected with said conveyer-fan, substantially as and for the purposes described.

5. In a pneumatic grain-conveyer, the combination with a series of bins, a conveyer-fan, and a pipe, 42, connecting the bins and fan, of a delivery-pipe operatively connected with said fan, a reciprocating pipe or spout fitted to said delivery-pipe and having oppositely-facing nozzles, and means for reciprocating said pipe or spout on the delivery-pipe, substantially as described.

6. In a pneumatic grain-elevator, the combination with a delivery-pipe, and a conveyer-fan, of means for operatively connecting said discharge-pipe with the conveyer-fan, a reciprocating pipe or spout having oppositely-facing nozzles, a rack-bar pivoted to said reciprocating pipe or spout, and a driving-shaft geared to said reciprocating rack-bar, substantially as and for the purposes described.

7. In a pneumatic grain-elevator, the combination with a series of storage-bins having the flaring walls, and a conveyer-fan, of a return-pipe situated beneath and adjacent to the storage-bins and provided with a plurality of openings or ports, which open directly into each of the storage-bins, gates or valves in operative relation to said ports or openings of the return-pipe and adapted to establish communication between each bin and said return-pipe, a telescopic pipe fitted to said return-pipe and adapted to be connected with the fan-casing, a conveyer-pipe having an adjustable length or section, and a delivery-pipe, substantially as and for the purposes described.

8. In a pneumatic grain-conveyer, the combination with a fan, and a delivery-pipe connected thereto, of a reciprocating distributer pipe or spout communicating with said delivery-pipe, and means for positively actuating said distributer pipe or spout, whereby the grain may be conveyed through and distributed by the spout or pipe, substantially as described.

9. In a pneumatic grain-conveyer, the combination with a fan, and a delivery-pipe connected thereto, of a distributer spout or pipe slidably fitted to the delivery-pipe and provided with oppositely-facing nozzles, and means for positively moving said distributer spout or pipe with relation to the delivery-pipe, substantially as described.

10. In a pneumatic grain-conveyer, the combination of bins arranged in series, a conveyer-pipe extending along the bottoms of the bins and having ports which communicate individually with said bins, valves for cutting off communication between the conveyer-pipe and the individual bins, a conveyer-fan, an adjustable pipe between the conveyer-pipe and the eye of the conveyer-fan, and a delivery-pipe leading from the conveyer-fan, substantially as described.

In testimony that I claim the foregoing as my own I have hereto affixed my signature in the presence of two witnesses.

WILLIS P. WRIGHT.

Witnesses:
ABEL FISHER,
JOHN WRIGHT.